United States Patent
Hentges

(10) Patent No.: US 7,813,084 B1
(45) Date of Patent: Oct. 12, 2010

(54) CO-PLANAR SHIELDED WRITE TRACES FOR DISK DRIVE HEAD SUSPENSIONS

(75) Inventor: Reed T. Hentges, Buffalo, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 851 days.

(21) Appl. No.: 11/709,419

(22) Filed: Feb. 22, 2007

(51) Int. Cl.
    *G11B 5/48* (2006.01)
(52) U.S. Cl. .................................. 360/245.9
(58) Field of Classification Search ............. 360/245.9, 360/246, 245.8, 264.2, 246.1
    See application file for complete search history.

(56) References Cited

U.S. PATENT DOCUMENTS

| | | | |
|---|---|---|---|
| 4,870,375 A | 9/1989 | Krueger, Jr. et al. | |
| 5,446,611 A * | 8/1995 | Webber ...................... | 360/245 |
| 5,490,027 A | 2/1996 | Hamilton et al. | |
| 5,631,786 A | 5/1997 | Erpelding | |
| 5,737,152 A | 4/1998 | Balakrishnan | |
| 5,796,552 A * | 8/1998 | Akin et al. ............... | 360/264.2 |
| 5,995,328 A | 11/1999 | Balakrishnan | |
| 6,038,102 A | 3/2000 | Balakrishnan et al. | |
| 6,100,582 A | 8/2000 | Omote et al. | |
| 6,151,197 A * | 11/2000 | Larson et al. ............... | 360/255 |
| 6,275,358 B1 | 8/2001 | Balakrishnan et al. | |
| 6,587,310 B1 | 7/2003 | Bennin et al. | |
| 6,614,624 B2 * | 9/2003 | Shiraishi et al. .......... | 360/245.9 |
| 6,839,204 B2 | 1/2005 | Shiraishi et al. | |
| 6,867,939 B2 * | 3/2005 | Katahara et al. .............. | 360/53 |
| 6,975,488 B1 * | 12/2005 | Kulangara et al. .......... | 360/246 |
| 7,092,215 B2 | 8/2006 | Someya et al. | |
| 7,301,730 B2 * | 11/2007 | Lee et al. ..................... | 360/255 |
| 7,365,945 B2 * | 4/2008 | Fujimoto et al. ............. | 360/255 |
| 7,375,931 B2 * | 5/2008 | Jayasekara et al. .......... | 360/323 |
| 7,450,347 B2 * | 11/2008 | Suzuki et al. ................ | 360/255 |
| 7,609,483 B2 * | 10/2009 | Deguchi et al. .......... | 360/254.7 |
| 2002/0071218 A1 * | 6/2002 | Shiraishi et al. .......... | 360/245.9 |
| 2003/0193762 A1 * | 10/2003 | Hayashi et al. ......... | 360/324.12 |
| 2005/0030671 A1 * | 2/2005 | Lee et al. ..................... | 360/255 |
| 2005/0122627 A1 | 6/2005 | Kanagawa et al. | |
| 2005/0174694 A1 * | 8/2005 | Erpelding ................. | 360/244.8 |

FOREIGN PATENT DOCUMENTS

EP    0 834 867    5/2007

* cited by examiner

*Primary Examiner*—Allen T Cao
(74) *Attorney, Agent, or Firm*—Faegre & Benson LLP

(57) ABSTRACT

An integrated lead head suspension flexure including a spring metal base layer, an insulating layer on the base layer and traces on the insulating layer. The traces include first and second adjacent and co-planar write traces and first and second shield traces. The shielding traces are on opposite sides of the write traces, electrically interconnected and generally co-planar with the write traces. Portions of the stainless steel layer below the traces include windows. The shield traces can be connected to ground and/or to the spring metal base layer.

7 Claims, 4 Drawing Sheets

CO-PLANAR SHIELDED WRITE TRACES FOR DISK DRIVE HEAD SUSPENSIONS

FIELD OF THE INVENTION

The present invention relates generally to disk drive head suspensions. In particular, the invention is an integrated lead flexure for a suspension.

BACKGROUND OF THE INVENTION

Disk drive head suspensions with wireless or integrated lead flexures are generally known and disclosed, for example, in the following U.S. Patents, all of which are incorporated herein by reference.

| Inventor Name | U.S. Pat. No. |
| --- | --- |
| Erpelding | 5,631,786 |
| Balakrishnan | 5,737,152 |
| Balakrishnan | 5,995,328 |
| Balakrishnan et al. | 6,038,102 |
| Balakrishnan et al | 6,275,358 |
| Shiraishi et al. | 6,839,204 |
| Kulangara et al. | 6,975,488 |

The continuing development of read/write head and related disk drive technology requires head suspensions having improved mechanical and electrical specifications. For example, there is a need for suspensions having increased signal current carrying capabilities, higher data rates and reduced size. Unfortunately, optimizing features of the suspensions to meet these goals is increasingly difficult. It is known, for example, that current carrying capabilities can be increased by widening the traces or decreasing the distance between adjacent traces. But constraints on the size of portions of the flexure traversed by the traces can limit the size of the traces. Although it is known that data rates can be increased by removing portions of the stainless steel spring metal below the traces (i.e. windowing), this approach can lead to higher impedances. There remains, therefore, a continuing need for improved integrated lead flexures.

SUMMARY OF THE INVENTION

The present invention is an integrated lead head suspension flexure that provides enhanced signal transmission bandwidth without increases in impedance. One embodiment of the flexure includes a spring metal base layer, an insulating layer on the base layer and traces on the insulating layer. The traces comprise first and second adjacent and co-planar write traces and first and second shield traces. The shield traces are on opposite sides of the write traces, electrically interconnected and generally co-planar with the write traces. Another embodiment of the flexure includes windows in the spring metal layer below the write and shield traces.

DETAILED DESCRIPTION OF THE PREFERRED EMBODIMENTS

Figure 1:
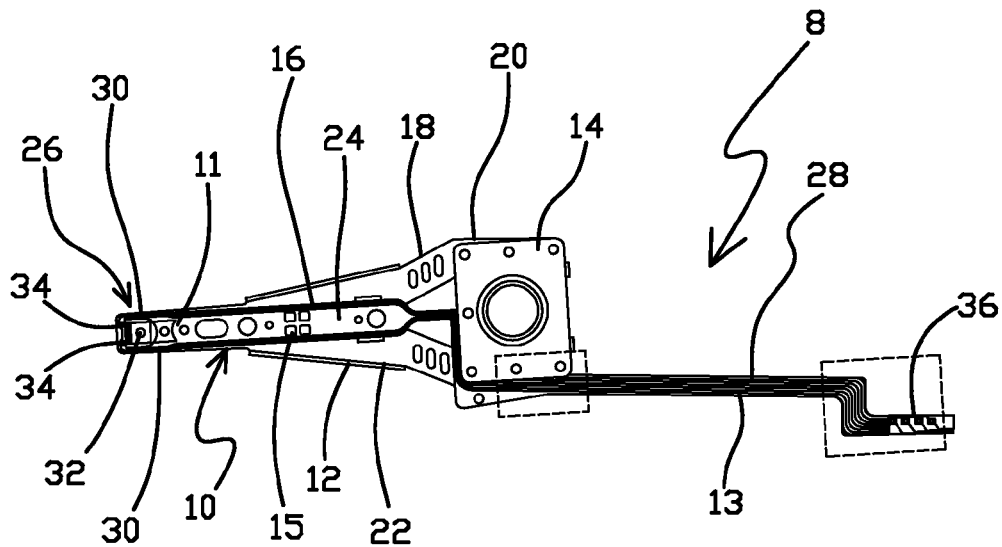
FIG. 1 is an illustration of a disk drive head suspension having a flexure in accordance with the present invention.

A disk drive head suspension 8 including a flexure 10 having co-planar shielded write traces 11 in accordance with one embodiment of the present invention is illustrated generally in FIG. 1. Suspension 8 is a three-piece assembly in the illustrated embodiment, and includes a load beam 12 and base plate 14 in addition to the flexure 10. Load beam 12, which is typically formed from stainless steel, includes a beam region 16, hinge or spring region 18 and mounting region 20. Rails 22 are formed on the side edges of the beam region 16. Base plate 14 is welded to the mounting region 20 at the proximal end of the load beam 12.

Flexure 10 is an integrated lead or wireless flexure and includes a mounting or base region 24 that is welded or otherwise attached to the beam region 16 of load beam 12, a gimbal region 26 at its distal end, and a tail 28 extending from the proximal end of the base region. The gimbal region 26 includes a pair of laterally-spaced spring arms $30_1$ and $30_2$ extending from the base region 24, and a slider mounting region 32 that extends from and is supported by and between the spring arms. A plurality of head bond pads 34 are located on the gimbal region 26 adjacent to the slider mounting region 32. A plurality of terminal pads 36 are located on the proximal end of the flexure tail 28. In addition to write traces 11, read traces 13, shield traces $15_1$ and $15_2$ and ground traces $17_1$ and $17_2$ extend along the flexure 10 between the head bond pads 34 and terminal pads 36.

Figure 2:
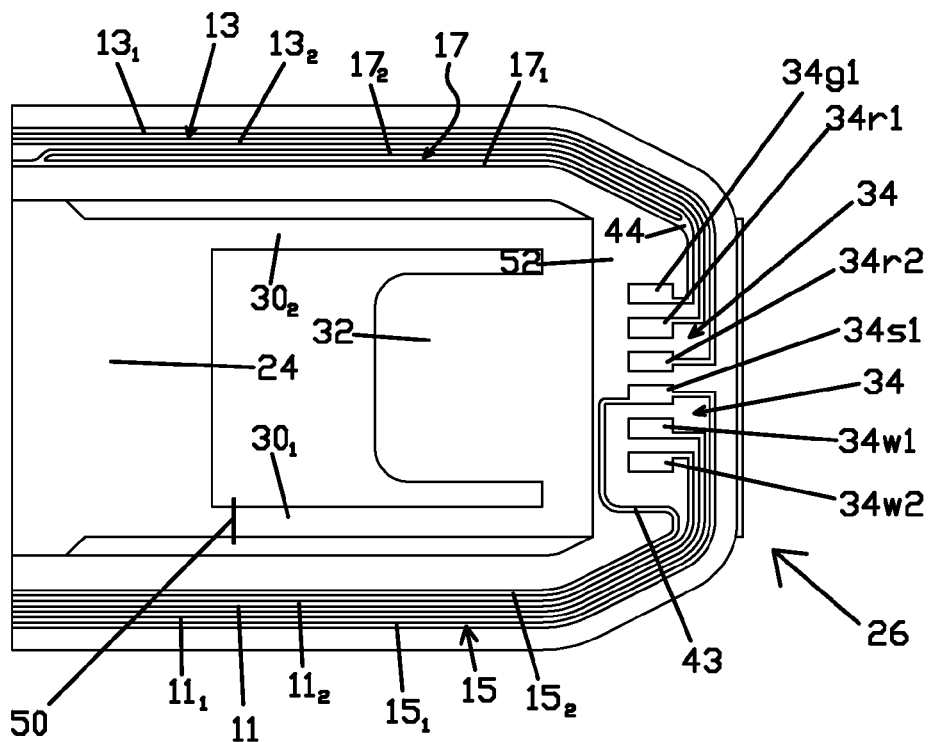
FIG. 2 is a detailed illustration of the gimbal region of the flexure shown in FIG. 1.

FIG. 2 is a detailed illustration of the gimbal region 26 of flexure 10. As shown, the head bond pads 34 include first and second adjacent write pads $34_{W1}$ and $34_{W2}$, first and second adjacent read pads $34_{R1}$ and $34_{R2}$, shield bond pad $34_{S1}$ and ground bond pad $34_{G1}$. Two write traces $11_1$ and $11_2$ extend from the write bond pads $34_{W1}$ and $34_{W2}$, respectively, around the gimbal spring arm $30_1$ to the flexure base region 24. As shown in FIG. 2, the write traces $11_1$ and $11_2$ are adjacent to one another (i.e., there is no trace between them) throughout the gimbal region 26. A first shield trace $15_1$ extends from the shield bond pad $34_{S2}$ along and adjacent to write trace $11_1$ around the gimbal spring arm $30_1$ to the base region 24. A second shield trace $15_2$ is connected to the shield bond pad $34_{S1}$ and extends along and adjacent to the write trace $11_2$ around the gimbal spring arm $30_1$ to the base region 24. The shield traces $15_1$ and $15_2$ are co-planer with and located on opposite sides of the write traces $11_1$ and $11_2$ on the first spring arm $30_1$ of the gimbal region 26. Although not shown, portions of the traces 11, 15 and 17 can be protected by a covercoat.

A pair of adjacent ground traces $17_1$ and $17_2$ extend from ground bond pad $34_{G1}$ around the gimbal spring arm $30_2$ to the flexure base region 24. As shown, the ground traces $17_1$ and $17_2$ are connected to the ground pad $34_{G1}$ through a bifurcation link 44. First and second read traces $13_1$ and $13_2$ extend from the read bond pads $34_{R1}$ and $34_{R2}$, respectively, around the gimbal spring arm $30_2$ to the flexure base region 24. As shown in FIG. 2, the read traces $13_1$ and $13_2$ are adjacent to one another throughout the gimbal region 26.

Base region 24 and portions of the gimbal region 26 including the spring arms $30_1$ and $30_2$ and slider mounting region 32 are formed from a spring metal layer 50. Stainless steel is commonly used for the spring metal layer 50 in applications of this type. Portions of the electrical structures including bond pads 34, write traces 11, read traces 13, shield traces 15 and ground traces 17 that overlay the spring metal layer 50 are spaced and electrically insulated from the spring metal layer by an insulating layer 52. Polyimide is commonly used for the insulating layer 52 in applications of this type. The portions of write traces $11_1$ and $11_2$ and shield traces $15_1$ and $15_2$ that extend around spring arm $30_1$ between the head bond pads 34 and the base region 24 are backed by the insulating layer 52. These portions of the traces $11_1$, $11_2$, $15_1$ and $15_2$ and the backing of insulating layer 52 are outrigger trace portions in the illustrated embodiment, and are located outside the spring arm $30_1$, opposite the spring arm from the slider mounting region 32. A tab (not shown in FIG. 2) in the spring metal layer 50 can extend from the spring arm $30_1$ to support the outrigger portions of the traces $11_1$, $11_2$, $15_1$ and $15_2$ and the backing of insulating layer 52. Similarly, a tab (not shown) can extend from the spring arm $30_2$ and supports outrigger portions of the traces $13_1$, $13_2$, $17_1$ and $17_2$ and the backing of insulating layer 52. The head bond pads 34 can be flying pads, and extend over a window (not shown in FIG. 2) in the spring metal layer 50. In other embodiments of the invention (not shown) some or all of the head bond pads and portions or all of the write, read, shield and ground traces can be backed by or overlay the spring metal layer (e.g., the traces can be over the spring arms). In still other embodiments of the invention (not shown) the gimbal region 26 can include interconnects and/or vias or other structures for electronically connecting ground bond pad $34_{G1}$ and/or shield pad $34_{S1}$ to the stainless steel layer 50.

Figure 3:
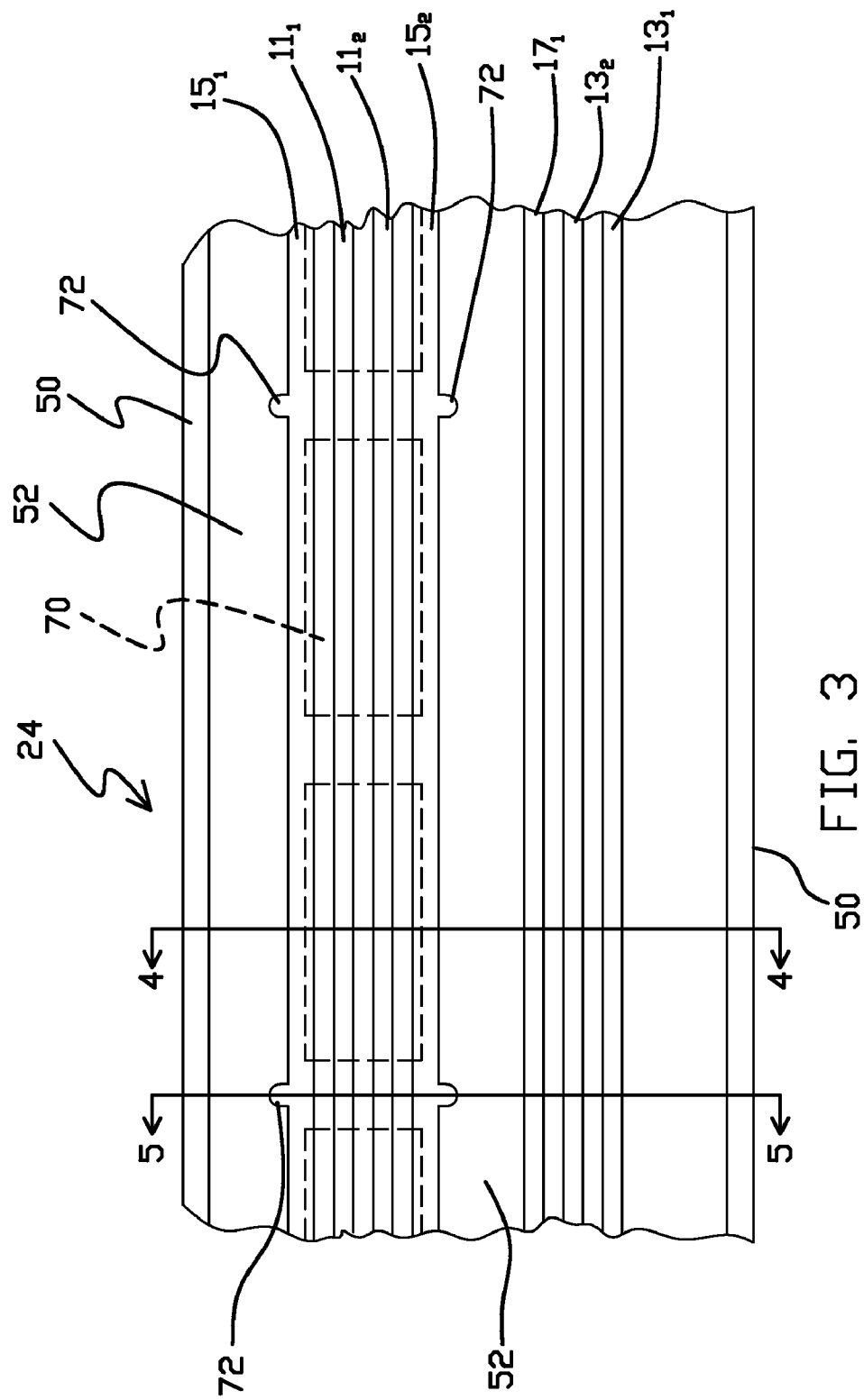
FIG. 3 is a detailed illustration of a portion of the base region of the flexure shown in FIG. 1.
Figure 4:
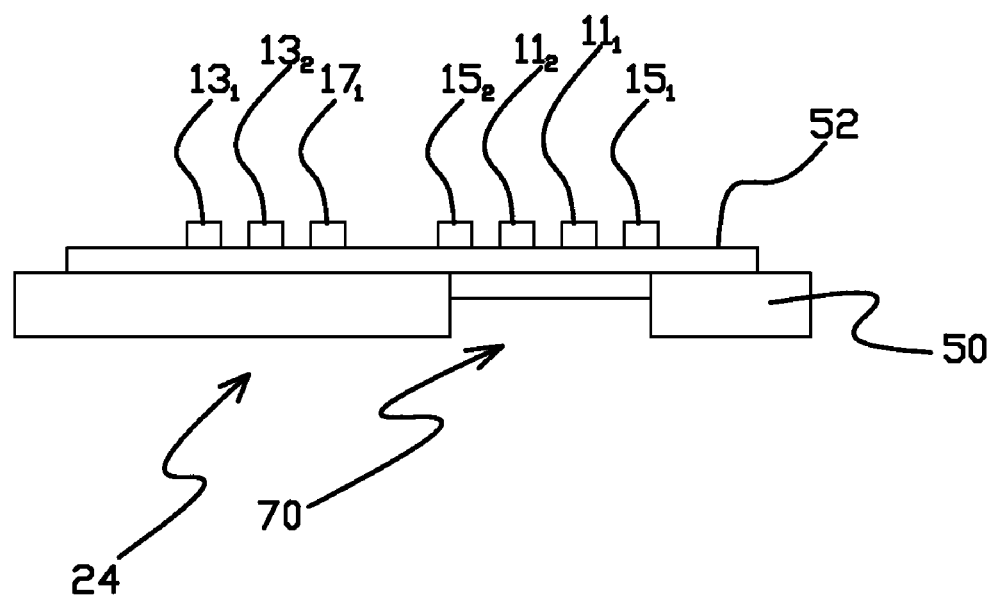
FIG. 4 is a cross section of a portion of the flexure base region shown in FIG. 3, taken at line 4-4 in FIG. 3.
Figure 5:
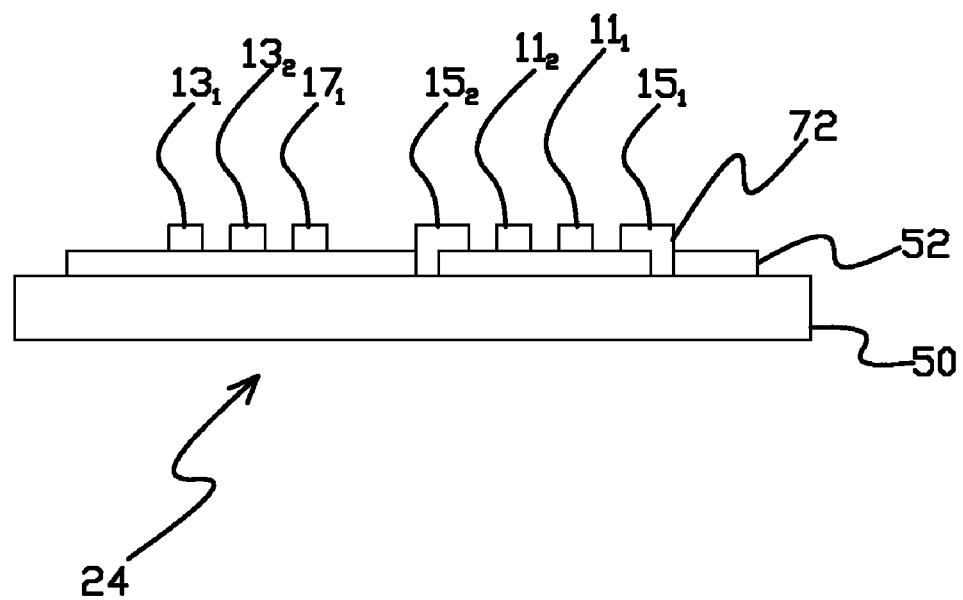
FIG. 5 is a cross section of another portion of the flexure base region shown in FIG. 3, taken at line 5-5 in FIG. 3.

FIG. 3 is a detailed top view of a portion of the flexure base region 24. FIGS. 4 and 5 are sectional views of portions of the base region 24 shown in FIG. 3. As shown, write traces $11_1$ and $11_2$ are immediately adjacent and parallel to one another. Shield trace $15_1$ is opposite write trace $11_1$ from write trace $11_2$, and is immediately adjacent and parallel to the write trace $11_1$. Similarly, shield trace $15_2$ is opposite write trace $11_2$ from write trace $11_1$, and is immediately adjacent and parallel to the write trace $11_2$. Traces $11_1$, $11_2$, $15_1$ and $15_2$ are generally co-planar. Traces $11_1$, $11_2$, $15_1$ and $15_2$ are thereby grouped together, with shield traces $15_1$ and $15_2$ bordering the pair of adjacent write traces $11_1$ and $11_2$. Windows 70 in the spring metal layer 50 are located below portions of the traces $11_1$, $11_2$, $15_1$ and $15_2$.

Read traces $13_1$ and $13_2$ and ground trace $17_1$ are also grouped together and spaced from the group of traces $11_1$, $11_2$, $15_1$ and $15_2$. Ground trace $17_2$ is connected and merged into ground trace $17_1$ at a location (shown in FIG. 2) between the portion of flexure base region 24 shown in FIG. 3 and the gimbal region 26, and is not visible in FIG. 3. As shown, read traces $13_1$ and $13_2$ are immediately adjacent and parallel to one another. Ground trace $17_1$ is opposite read trace $13_2$ from read trace $13_1$, and is immediately adjacent and parallel to the read trace $13_2$. The illustrated embodiment of flexure base region 24 includes the spring metal layer 50 below the traces $13_1$, $13_2$ and $17_1$. Other embodiments of the invention (not shown) include windows such as 70 below the traces $13_1$, $13_2$ and $15_3$. Although not shown in FIGS. 3-5, portions of all of the flexure base region 24 can be covered by a covercoat.

As shown in FIGS. 3 and 5, the shield traces $15_1$ and $15_2$ include connection vias 72 at periodically spaced locations along their lengths. Connection vias 72 are conductive members that extend through the insulating layer 52 and electrically connect the shield traces $15_1$ and $15_2$ to one another through the spring metal layer 50.

Figure 6:
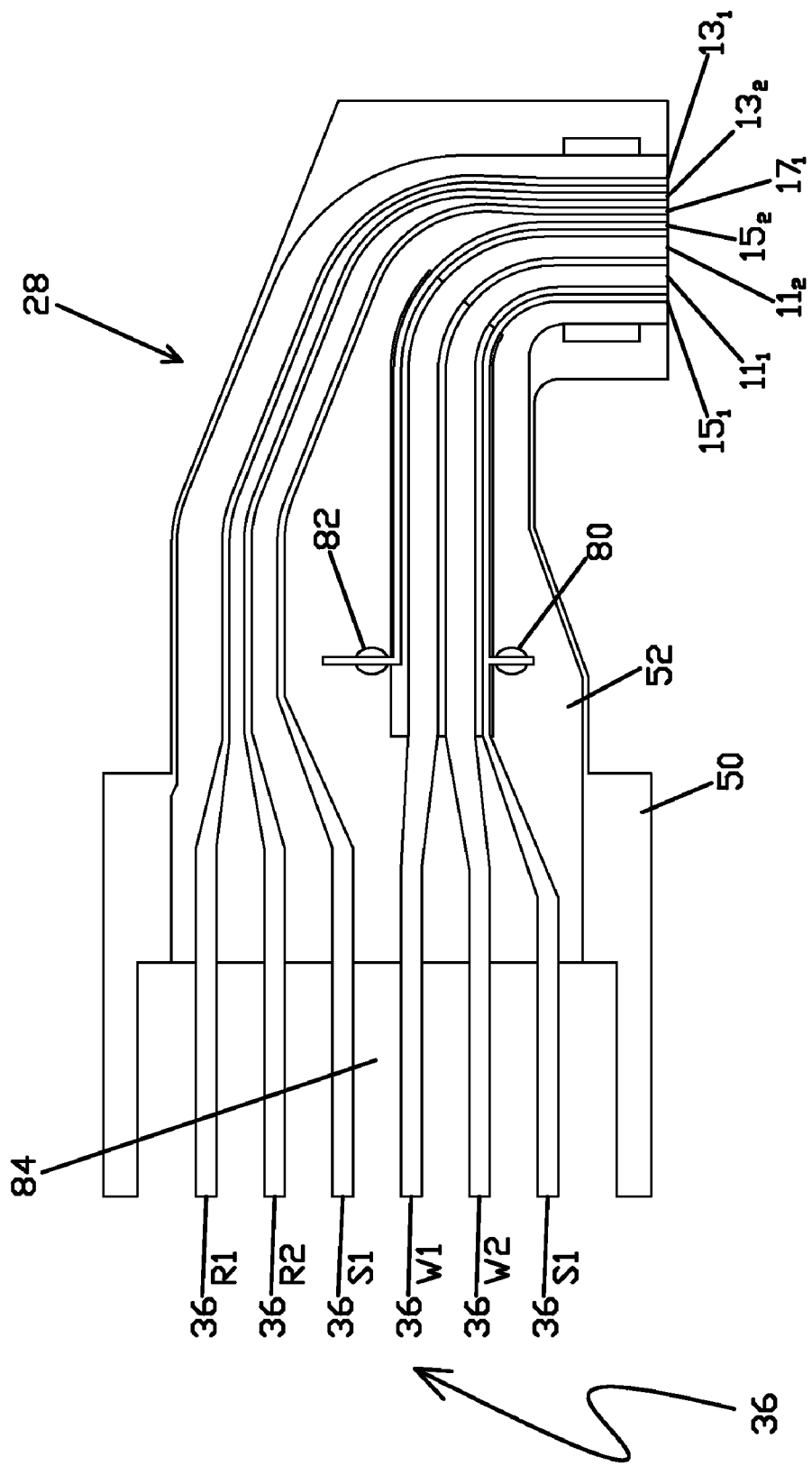
FIG. 6 is a detailed illustration of a portion of the tail of the flexure shown in FIG. 1.

FIG. 6 is an illustration of a portion of the tail 28 of flexure 10. As shown, the write traces $11_1$ and $11_2$ terminate at terminal pads $36_{W1}$ and $36_{W2}$, respectively. The shield trace $15_1$ adjacent to write trace $11_1$ terminates at terminal pad $36_{S2}$. A connection via 80 also connects the shield trace $15_1$ to the spring metal layer 50 through the insulating layer 52 at a location on the tail 28 distal to the terminal pad $36_{S1}$. The shield trace $15_2$ adjacent to write trace $11_2$ terminates at a connection via 82 at a location on the tail 28 distal to the terminal pads 36. Connection via 82 electrically connects the shield trace $15_2$ to the spring metal layer 50 through the insulating layer 52. Read traces $13_1$ and $13_2$ terminate at terminal pads $36_{R1}$ and $36_{R2}$, respectively. The ground trace $17_1$ adjacent to read trace $13_1$ terminates at terminal pad $36_{G1}$. Terminal pads 36 are flying leads in the illustrated embodiment and extend over a window 84 in the spring metal layer 50. In other embodiments (not shown) the terminal pads 36 overlay the spring metal layer 50. Although not shown in FIG. 5, portions of the tail 28 such as traces $11_1$, $11_2$, $13_1$, $13_2$, $15_1$, $15_2$ and $17_1$ can be covered by a covercoat.

When incorporated into a disk drive (not shown) the terminal pads $36_{W1}$ and $36_{W2}$ are interconnected to electronic circuits (also not shown) to receive write signals. These write signals are then electrically coupled through the write traces $11_1$ and $11_2$ and bond pads $34_{W1}$ and $34_{W2}$ to the write head terminals of a slider (not shown) mounted to the slider mounting region 32 on the gimbal region 26. The terminal pad $36_{S1}$ is interconnected to a ground or other common potential in the drive electronic circuits, thereby effectively connecting shield traces $15_1$ and $15_2$ and the spring metal layer 50 to the ground. Research has shown that the shield traces $15_1$ and $15_2$ effectively function as shields in connection with the write traces $11_1$ and $11_2$. The electromagnetic coupling during signal transmission is substantially between the write traces $11_1$ and $11_2$ and the shield traces $15_1$ and $15_2$. The result is enhanced electrical performance, including higher bandwidth signal transmission and reduced signal loss without increased impedance. Cross-talk between the write traces $11_1$ and $11_2$ and the read traces $13_1$ and $13_2$ will also decrease with increasing space between the write and read traces on the flexure 10.

The read bond pads $34_{R1}$ and $34_{R2}$ on gimbal region 26 are connected to the read head terminals of a slider (not shown) mounted to the slider mounting region 32. The read signals are electrically coupled through the read traces $13_1$ and $13_2$ to terminal pads $36_{R1}$ and $36_{R2}$. The terminal pads $36_{R1}$ and $36_{R2}$ are interconnected to electronic circuits (not shown) in a disk drive to receive the read signals. A ground terminal associated with the magnetic head of the slider is connected to the ground bond pad $34_{G1}$ on gimbal region 26 and coupled to the disk drive electronic circuits through the ground trace $17_1$ and terminal pad $36_{G1}$. Although in the illustrated embodiment read traces $13_1$ and $13_2$ are not bounded by co-planer shielding ground traces, and the stainless steel layer 50 is free of windows in the regions below the traces, these features and associated advantages are incorporated into other embodiments of the invention. Flexure 10 can be manufactured using conventional or otherwise known additive and/or subtractive processes including photolithography, wet and dry etching and deposition processes.

Although the shield traces $15_1$ and $15_2$ are shown connected to ground potential in the illustrated embodiment, they are connected to other potentials in other embodiments (not shown). In still other embodiments the shield traces $15_1$ and $15_2$ can be electrically floating with respect to the potential on write traces $11_1$ and $11_2$. Shield traces $15_1$ and $15_2$ will typically be of the same (or floating) potential, and are preferably connected to one another.

Although the present invention has been described with reference to preferred embodiments, those skilled in the art will recognize that changes can be made in form and detail without departing from the spirit and scope of the invention.

What is claimed is:

1. An integrated lead head suspension flexure including:
   a spring metal base layer;
   an insulating layer on the base layer; and
   traces on the insulating layer, including:
   first and second immediately adjacent and co-planar write traces; and
   first and second electronically interconnected shield traces on opposite sides of the write traces and generally co-planar with the write traces.

2. The integrated lead head suspension flexure of claim 1 and further including one or more interconnects between each of the first and second shield traces and the spring metal base layer.

3. The integrated lead head suspension flexure of claim 1 and further including windows in the spring metal base layer adjacent portions of the write and shield traces and opposite the insulating layer from the write and shield traces.

4. The integrated lead head suspension flexure of claim 1 and further including first and second adjacent read traces opposite one of the shield traces from the write traces.

5. The integrated lead head suspension flexure of claim 1 and further including at least one terminal pad on the flexure connected to at least one of the first and second shield traces.

6. The integrated lead head suspension of flexure of claim 5 wherein the terminal pad is a ground terminal.

7. The integrated lead head suspension of flexure of claim 5 and further including at least one bond pad on the flexure connected to at least one of the first and second shield traces.

* * * * *